(12) United States Patent
Da Pont et al.

(10) Patent No.: US 8,960,638 B2
(45) Date of Patent: Feb. 24, 2015

(54) ELECTROMAGNETIC VALVE DEVICE (75) Inventors: Paolo Da Pont, Turin (IT); Paolo Ravedati, Moncalieri (IT); Giosué Capizzi, Buttigliera Alta (IT); Maurizio Rendesi, Villarbasse (IT); Fabrizio Paris, Druento (IT); Roberto Bosio, Turin (IT); Massimo Davi, Bussoleno (IT)

(73) Assignee: Elbi International S.p.A., Turin (IT)

( * ) Notice: Subject to any disclaimer, the term of this patent is extended or adjusted under 35 U.S.C. 154(b) by 251 days.

(21) Appl. No.: 13/510,852

(22) PCT Filed: Nov. 22, 2010

(86) PCT No.: PCT/IT2010/000466
§ 371 (c)(1),
(2), (4) Date: May 18, 2012

(87) PCT Pub. No.: WO2011/061777
PCT Pub. Date: May 26, 2011

(65) Prior Publication Data
US 2012/0228535 A1    Sep. 13, 2012

(30) Foreign Application Priority Data

Nov. 20, 2009 (IT) .............................. TO2009A0897
Oct. 19, 2010 (IT) .............................. TO2010A0844

(51) Int. Cl.
F16K 31/02 (2006.01)
F16K 31/40 (2006.01)
F16K 31/06 (2006.01)

(52) U.S. Cl.
CPC ........... *F16K 31/404* (2013.01); *F16K 31/0693* (2013.01)
USPC .................................. 251/129.15; 251/30.03

(58) Field of Classification Search
USPC .................. 251/30.03, 30.02, 30.01, 129.15, 251/129.21
See application file for complete search history.

(56) References Cited

U.S. PATENT DOCUMENTS

| 5,622,351 A * | 4/1997 | Kim .......................... 251/30.03 |
| 6,076,550 A * | 6/2000 | Hiraishi et al. ............ 251/30.03 |
| 6,290,203 B1 * | 9/2001 | Kolze .......................... 251/30.03 |
| 7,428,913 B2 * | 9/2008 | Benson .................... 251/129.15 |
| 8,641,153 B2 * | 2/2014 | Voss ......................... 251/129.15 |
| 2005/0166979 A1 | 8/2005 | Berger et al. |

FOREIGN PATENT DOCUMENTS

GB  2 296 075 A   6/1996
WO  2009/049625 A1  4/2009

\* cited by examiner

*Primary Examiner* — John Bastianelli
*Assistant Examiner* — Andrew J Rost
(74) *Attorney, Agent, or Firm* — Sughrue Mion, PLLC (57) ABSTRACT A solenoid valve device that includes a body (2, 7) with an inlet (3) and an outlet (4) for the fluid, and with a main valve seat (6) through which the fluid can flow from the inlet (3) to the outlet (4); a main plug (8, 9); a control chamber (11) partially delimited by the main plug (8); a first passage (8d, 9b, 9c) for communication between the inlet (3) and the control chamber (11); a second passage (12, 13) for communicating the control chamber with the outlet (4); and a control solenoid valve (14) including a control solenoid (15) which controls a movable unit (17) including a first core (18) which can interact as a movable plug with the second passage (12, 13). Activation of solenoid (15) causes attraction of first core (18) towards a second core (21) and the opening of the second passage (12, 13).

6 Claims, 7 Drawing Sheets

ELECTROMAGNETIC VALVE DEVICE

CROSS REFERENCE TO RELATED APPLICATION

This application is a National Stage of International Application No. PCT/IT2010/000466, filed on Nov. 22, 2010, which claims priority from Italian Patent Application Nos. TO2009A00897, filed on Nov. 20, 2009 and IT TO2010A000844, filed Oct. 19, 2010, the contents of all of which are incorporated herein by reference in their entirety.

The present invention relates to a solenoid valve device.

More specifically, the invention relates to a solenoid valve device of the type comprising:

- a body with an inlet for the fluid and an outlet for the fluid, and a main valve seat through which the fluid can flow from said inlet to the outlet;
- a main plug which is movable with respect to said valve seat between a closed position and an open position of said valve seat;
- a control chamber formed in the body and partially delimited by the main plug;
- at least a first communication passage between the fluid inlet and the control chamber, and at least a second passage for putting the control chamber into communication with the outlet; and
- a control solenoid valve, including an operating solenoid valve which controls a unit which is movable in the solenoid, said unit comprising a (first) ferromagnetic core which can interact, in the form of a movable plug, with said second passage.

An example of solenoid valve device of this type is described in British Patent GB 2 296 075 B in the name of the present applicant.

This solenoid valve according to the prior art comprises a single movable core, which, in the energized state of the associated solenoid, opens a passage provided in the main plug, thus putting the control chamber into communication with the outlet. In order to move this movable core, the solenoid must be energized by a rather high power (voltage).

This is because, in order to ensure that the movable core can leave said passage open even when the main plug has been raised from the associated seat, the energizing of the solenoid must cause a movement of the movable core which is greater than the expected maximum movement of the main plug.

One object of the present invention is to provide a solenoid valve device of the aforesaid type, made in such a way as to require a considerably lower electrical power for energizing the associated solenoid.

This and other objects are achieved according to the invention with a solenoid valve of the type defined above, characterized in that the aforesaid movable unit comprises an additional or second ferromagnetic core, mounted in said solenoid adjacent to one end of the aforesaid first core, and in that positioning means are provided for keeping the second movable core fixed to the main plug and, when the solenoid is inactive, for keeping the first core in the closed position of said second passage and the second core in a predetermined position with respect to the solenoid and to the first core, said cores being separated by a gap;

the arrangement being such that the energizing of the solenoid causes the attraction of the first core towards the second core and the opening of this passage.

In a known way, the opening of the aforesaid second passage then allows the main plug to move away from the associated valve seat, and allows the direct passage of fluid from the inlet to the outlet through said valve seat.

Because of the features defined above, in a solenoid valve device according to the present invention the second movable core is translated together with, and over the same distance as, the main plug, but the energizing of the solenoid only has to be sufficient to allow the first movable core to be attracted by the second movable core and to move over the small distance corresponding to the distance between said cores. In other words, regardless of the specified travel of the main plug, the solenoid only has to make the first movable core cover the small distance corresponding to the size of the aforesaid gap.

Further features and advantages of the invention will be made clear by the following detailed description, provided purely by way of non-limiting example, with reference to the appended drawings, in which.

Figure 1:
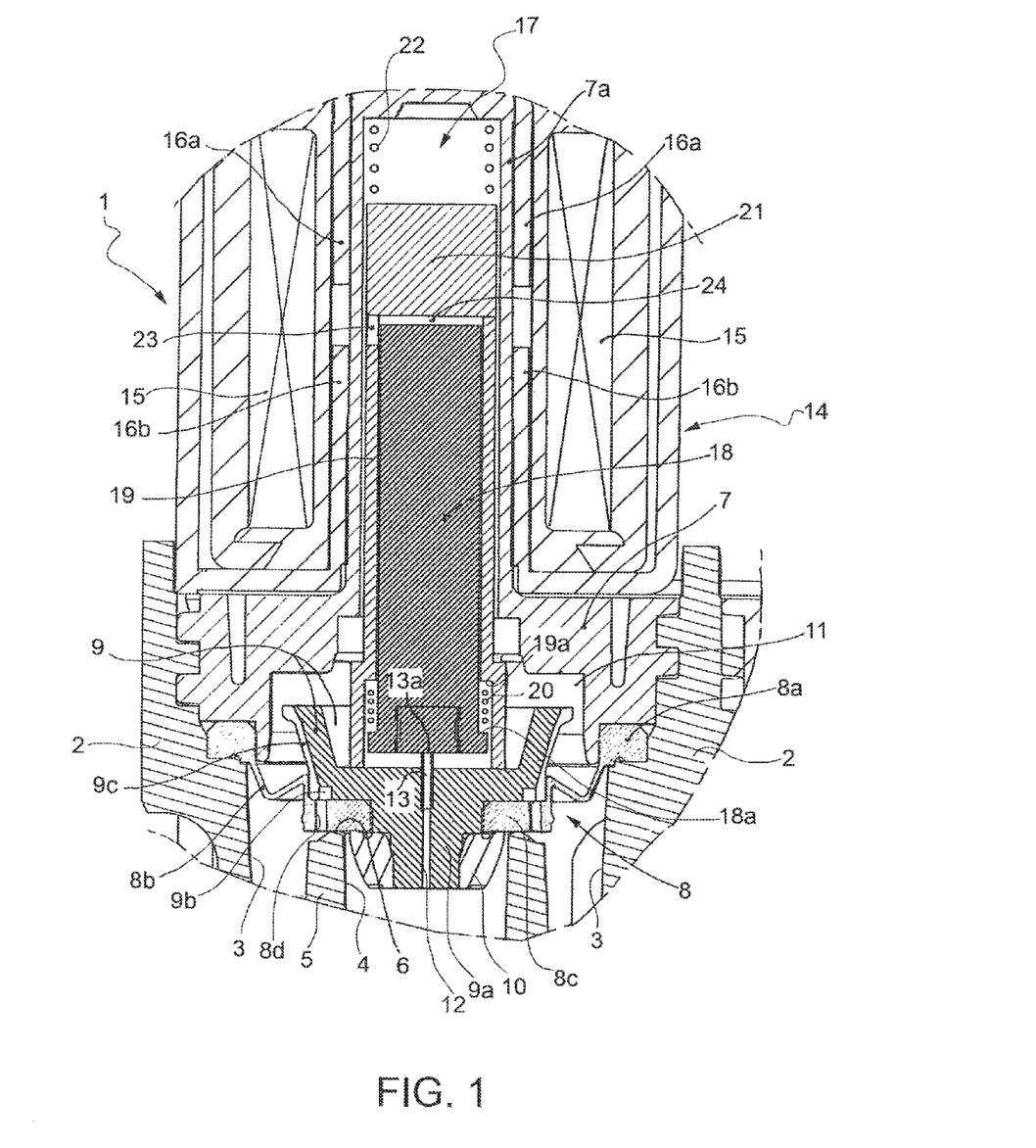
FIG. 1 is a partial view, in axial section, of a solenoid valve device according to the present invention.

In FIG. 1, the number 1 indicates the whole of a solenoid valve according to the invention, which can be used for example to control the supply of water from the water mains to a machine for washing such as a washing machine or a dishwasher.

The solenoid valve 1 comprises a body 2, made from moulded plastic material for example, in which an inlet passage 3 for a fluid (typically a hydraulic fluid) and an outlet passage 4 for this fluid are formed. In the illustrated exemplary embodiment, these passages 3 and 4 are coaxial, but this relative arrangement is not essential.

The outlet passage 4 is made in a tubular formation 5 of the body 2, the upper part of this formation defining a main valve seat 6. A flow of fluid can pass through this valve seat 6 from the inlet 3 to the outlet 4.

A second body 7, also made of plastic material for example, is coupled to the top of the body 2 in a fluid-tight way.

A peripheral portion 8a of an annular diaphragm indicated as a whole by 8 is clamped between the bodies 2 and 7. This membrane 8 comprises a flexible intermediate portion 8b, which connects the peripheral portion 8a to a thickened central annular portion 8c intended to act as the main plug interacting with the valve seat 6.

The portion 8c is mounted around a shank 9a of an essentially cup-shaped guide element 9, and is secured on this shank by means of an annular element 10.

The shaped body 7 has an upper tubular formation 7a, closed at its upper end.

A control chamber, indicated by 11, is formed between the body 7 and the assembly formed by the diaphragm 8 and the associated guide element 9.

The control chamber 11 is in permanent fluid communication with the inlet 3, through at least one passage which, in the illustrated exemplary embodiment, is formed in the unit comprising the diaphragm 8 and the associated guide element 9. In particular, as shown in FIG. 1, a plurality of through holes 8d are formed in the portion 8c of the membrane 8, outside the valve seat 6. These holes communicate with an annular compartment 9b formed in the diaphragm guide element 9, this compartment communicating in turn with corresponding outer grooves 9c which are also formed in the diaphragm guide 9.

As an alternative to the illustrated arrangement, communication between the inlet 3 and the chamber 11 can be established by means of passages provided in the diaphragm 8 and in the associated diaphragm guide 9, or provided in the body of the solenoid valve device.

The number 12 indicates a passage formed in the diaphragm guide 9, which can put the control chamber 11 into communication with the outlet passage 4.

In the illustrated embodiment, a tube 13, made of steel for example, is fitted in the upper portion of the passage 12, this tube having a projecting upper rim 13a which can act as a valve seat, as explained more fully below.

The solenoid valve device additionally comprises a control solenoid valve indicated as a whole by 14. This control solenoid valve comprises an operating solenoid 15 which is associated, in a known way, with a magnetic circuit comprising two tubular elements, namely an upper element 16a and a lower element 16b, which extend axially from opposite ends into this solenoid.

The corresponding ends of the elements 16a and 16b face each other at a predetermined distance, in an axially intermediate part of the solenoid 15.

The assembly formed by the solenoid 15 and the associated magnetic elements 16a and 16b is mounted around the tubular portion 7a of the body 7.

The control solenoid valve 14 also comprises a unit indicated as a whole by 17, which is mounted movably in the solenoid 15, and, in particular, is mounted movably with a radial clearance within the tubular portion 7a of the body 7. This unit 17 comprises a movable core 18 of ferromagnetic material, which bears on the valve seat 13a in the rest state (when the solenoid valve device 1 is closed).

The movable ferromagnetic core 18 is mounted inside a spacer element 19 made from non-magnetic material. In the illustrated exemplary embodiment, the spacer element is tubular (although it could be made in other shapes) and extends with a radial clearance inside the tubular portion 7a of the body 7.

The lower end of the element 19 has a larger diameter, and bears on the diaphragm guide 9 around the valve seat 13a.

The movable core 18 has a radial shoulder 18a, and a coil spring 20 is positioned between this shoulder and a facing inner shoulder 19a of the aforesaid tubular element 19. The spring 20 tends to push the movable core 18 against the seat 13a so that the core acts as a plug.

A second ferromagnetic core, indicated by 21, is positioned above the tubular element 19, in the portion 7a of the body 7.

A coil spring 22 is positioned between the upper end of the second core 21 and the upper end wall of the portion 7a of the body 7. This spring 22 tends to push the core 21 and the tubular element 19 downwards, particularly in such a way that the lower end of the tubular element 19 is kept in contact with the diaphragm guide 9.

Figure 2:
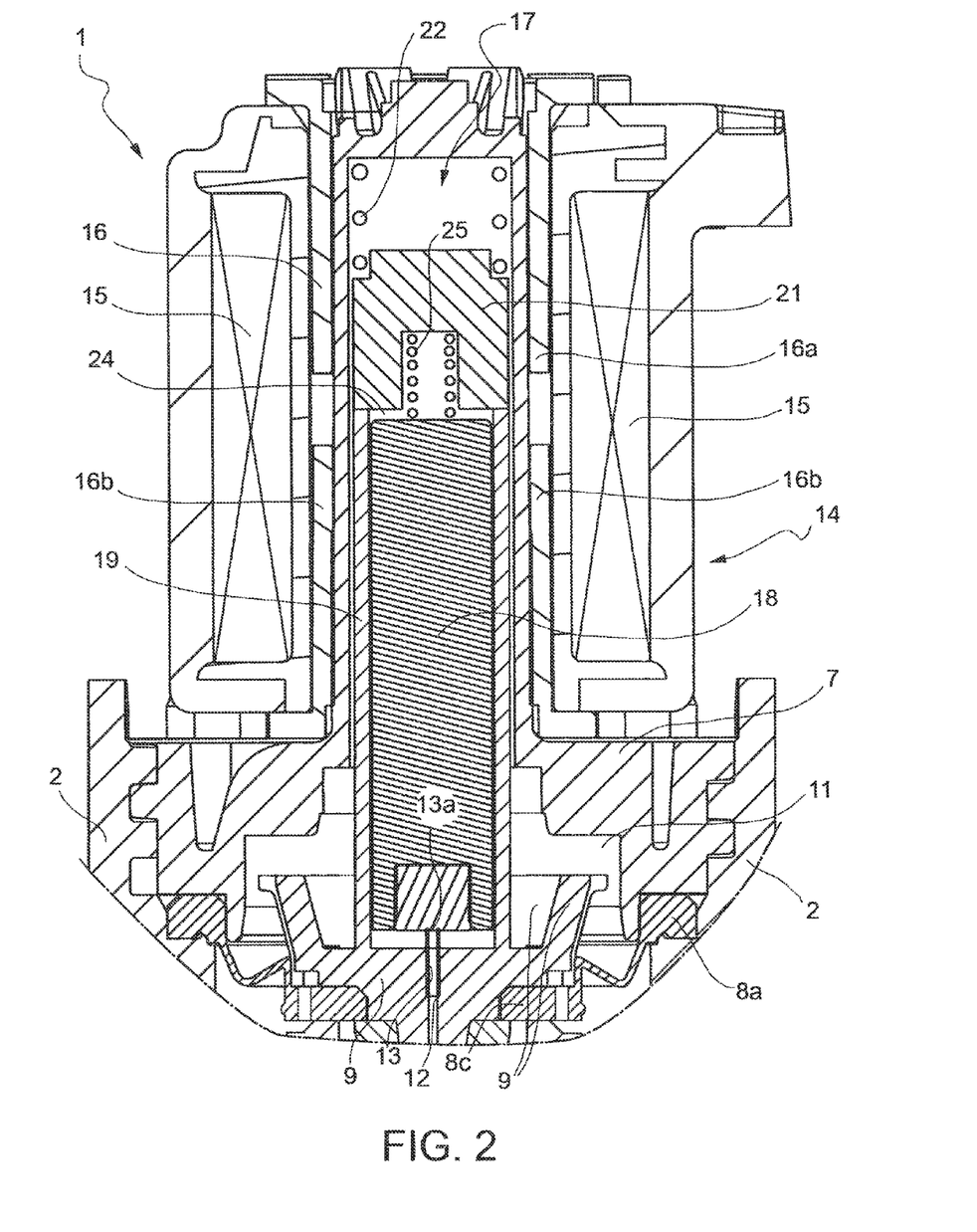
FIG. 2 is a similar view which shows a variant embodiment.

A spring 20 can be positioned in the gap 24 between the cores 18 and 21 in place of the spring 22 described above, in which case the element 19 and the core 18 do not have to be provided with the corresponding shoulders (as is seen in the variant shown in FIG. 2).

In the upper part of the tubular element 19, adjacent to the core 21, there is formed at least one aperture, indicated by 23 in FIG. 1, through which the gap formed between the portion 7a of the body 7 and the element 19 communicates with the gap formed between this element 19 and the lateral wall of the core 18.

The spacer element 19 can be separate and distinct from the core 21 and from the diaphragm guide 9, or can be integral with (or otherwise permanently fixed to) one and/or the other of the latter members (FIG. 2 shows an embodiment which is similar to that of FIG. 1, but which differs from it essentially in that the element 19 is made in one piece with the diaphragm guide 9).

In the rest state of the solenoid valve 1, shown in FIG. 1, the cores 18 and 21 are separated by a narrow gap indicated by 24.

In operation, when the solenoid 15 is inactive, the fluid supplied to the inlet 3 enters the control chamber 11 through the passage or passages 8d, 9b and 9c. The movable core and plug 18 closes the valve seat 13a, and the control chamber 11 is brought to the same fluid pressure as the inlet passage 3.

The portion 8c of the diaphragm 8, which acts as the main plug, bears on the valve seat 6, because the surface area of this diaphragm and of the associated diaphragm guide 9 exposed to the pressure in the chamber 11 is greater than the surface area of the membrane 8 which is exposed to the pressure in the passage 3. The main valve 8c-6 is therefore closed.

When the solenoid 15 is energized, a magnetic flux passes from the magnetic element 16a to the core 21, across the gap 24 to the core 18, and from there to the lower magnetic element 16b. Thus the core 18 is attracted towards the core 21. This attraction causes the valve seat 13a to be opened against the action of the spring 20.

The fluid pressure in the control chamber 11 can then be discharged towards the outlet passage 4, through the tube 13 and the passage 12 of the diaphragm guide 9.

As the pressure in the control chamber 11 decreases, the pressure in the inlet passage 3 which is applied to the diaphragm 8 causes the assembly formed by the diaphragm and the associated diaphragm guide 9 to rise, thus opening the main valve 8c-6.

The fluid supplied to the inlet passage 3 of the solenoid valve 1 can then reach the outlet passage through the valve seat 6.

The raising of the plug 8, 9 causes the core 21 to be raised by a corresponding amount and to draw with it the core 18 which is magnetically attracted to it; the seat 13a therefore continues to remain open.

The electrical power required to energize the solenoid 15 so as to create and maintain the attraction of the core 18 towards the core 21 is extremely low, and in particular it is independent of the opening travel of the main plug 8, 9.

As a general rule, with reference to FIGS. 1 and 2, the distance (the height of the gap 24) between the cores 18 and 21 is preferably less than the distance between the magnetic elements 16a and 16b, and the distance between each of the cores 18 and 21 and the associated magnetic elements 16a and 16b is also preferably less than the distance between the magnetic elements 16a and 16b.

As shown in FIG. 1, the gap 24, across which the cores 18 and 21 face each other, is located in an area which is located between the facing ends of the magnetic elements 16a and 16b with respect to the axis.

In other similar variant embodiments (see FIG. 3 for example), the elements 16a and 16b can be omitted if required, and in this case the second movable core 21 preferably extends upwards to a point in the proximity of the upper end of the solenoid 15.

With reference to FIG. 1, when the solenoid 15 is energized, fluid 3 flows from the inlet, through the passages 8d, 9b and 9c, into the control chamber 11, and then flows towards the upper part of the inner region of the tubular portion 7a of the body 7, through the gap formed between this tubular portion 7a and the tubular element 19. This fluid can then flow back downwards through the aperture 23 and the gap formed between the tubular element 19 and the core 18, towards the passage 12-13 and the outlet passage 4. The flow of fluid established in this way in the solenoid 15 advantageously reduces the temperature of the solenoid.

When the solenoid 15 is de-energized, the springs 22 and 20 tend to return the cores 21 and 18 to the rest positions shown in FIG. 1. The core 18 again shuts off the valve seat 13a, thus separating the control chamber 11 from the outlet passage 4.

The unit formed by the diaphragm 8 and the associated diaphragm guide 9 can then return to the closed position of the main valve seat 6.

Figure 3:
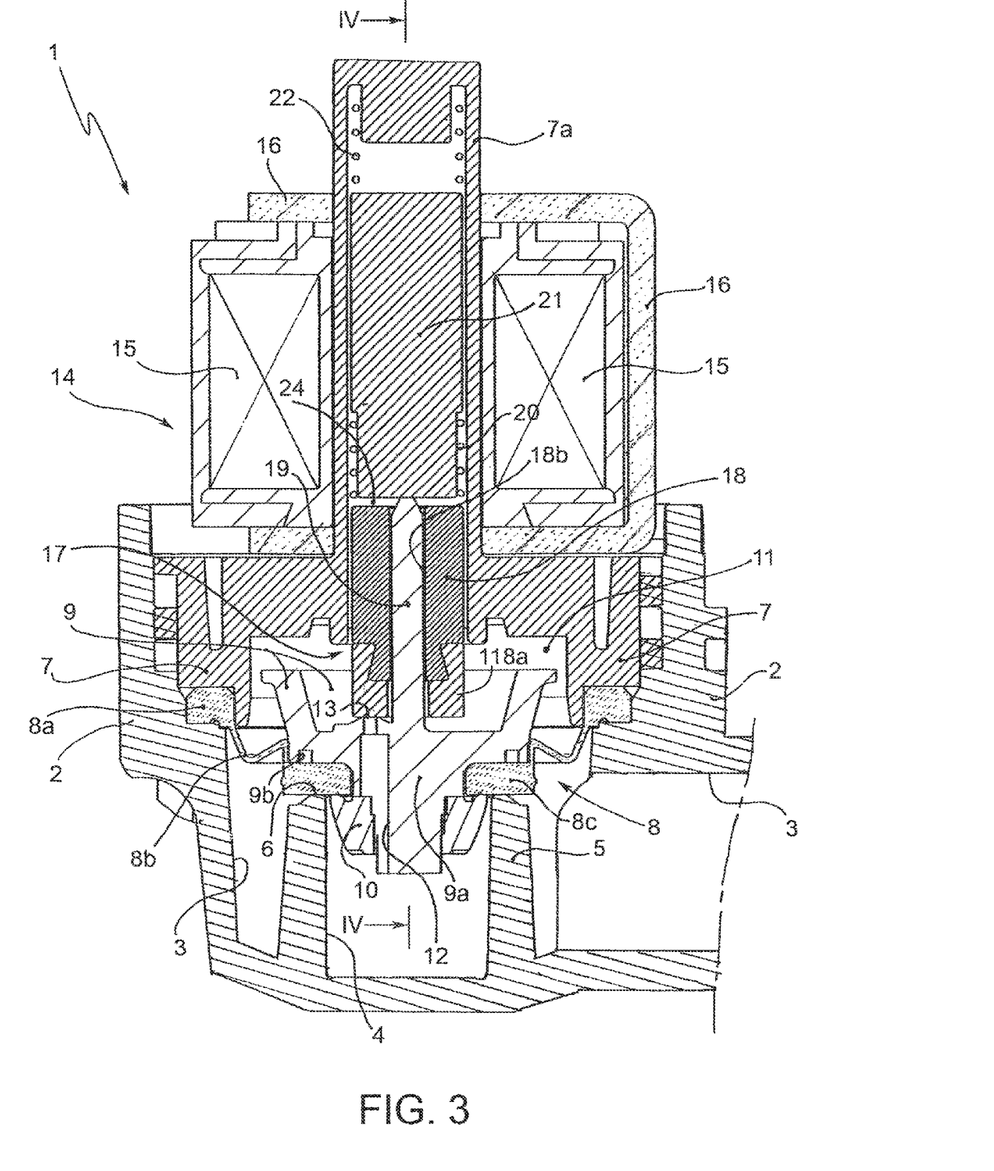
FIG. 3 is a partial view, in axial section, of another solenoid valve device according to the present invention.
Figure 4:
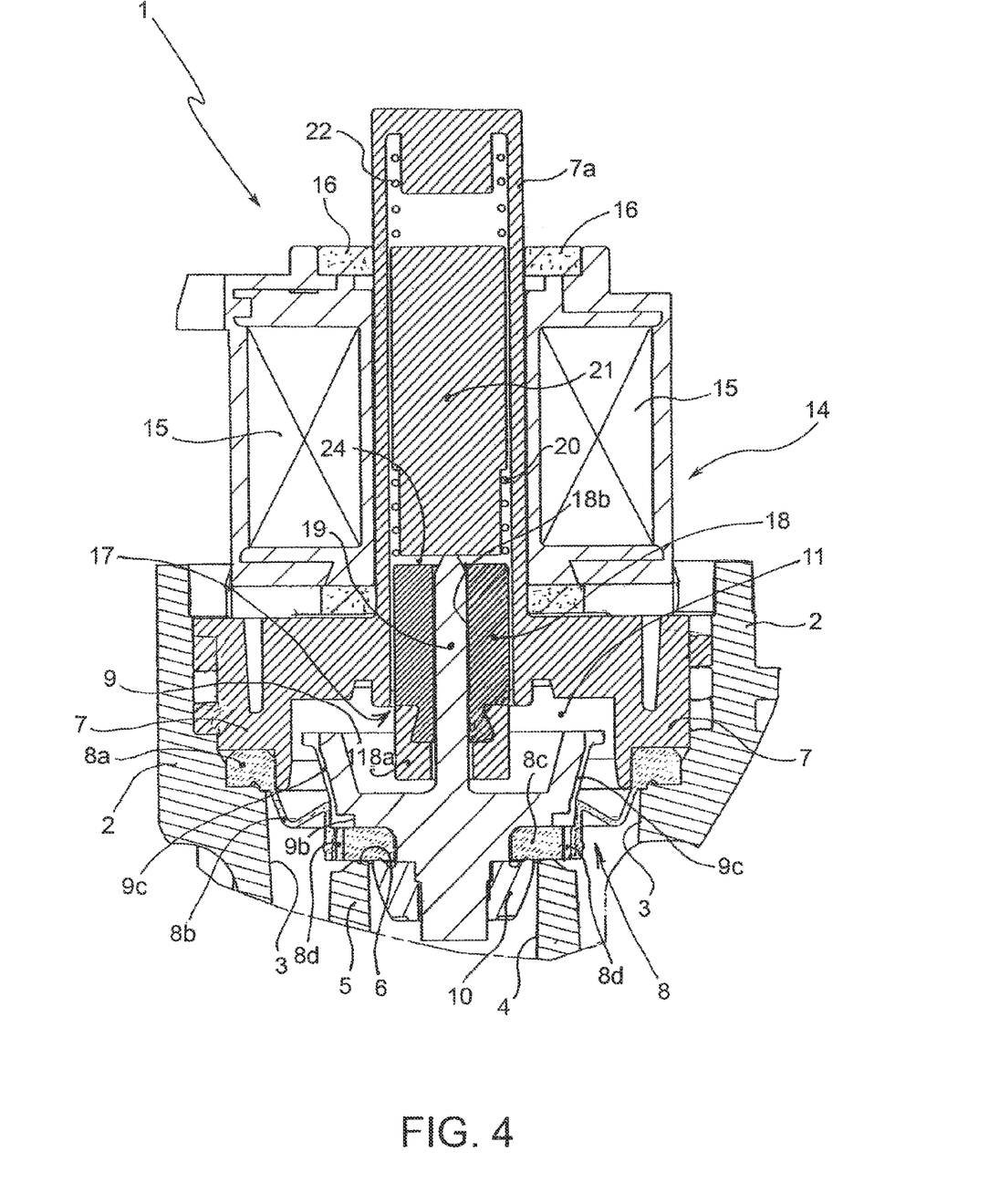
FIG. 4 is a partial view of a section taken essentially along the line IV-IV of FIG. 3.

FIGS. 3 and 4 show another variant embodiment. In these figures, parts and elements identical or functionally equivalent to parts and elements described previously have been given the same alphanumeric references as those used before.

In the embodiment shown in FIGS. 3 and 4, the upper end of the passage 12 forms a projecting edge 13 which can act as a valve seat, as explained more fully below.

The solenoid valve device 1 illustrated therein also comprises a control solenoid valve 14, comprising an operating solenoid 15 associated with a magnetic circuit comprising an essentially C-shaped shell 16 (FIG. 3).

The assembly formed by the solenoid 15 and the associated magnetic shell 16 is mounted around the tubular portion 7a of the body 7.

The control solenoid valve 14 also comprises a unit indicated as a whole by 17, which is mounted movably in the solenoid 15, and, in particular, is mounted movably with a radial clearance within the lower tubular portion 7a of the body 7. This unit 17 comprises a movable core 18 of ferromagnetic material, carrying at its lower end a plug 118a which bears on the valve seat 13 in the rest state (when the solenoid valve device 1 is closed).

The movable ferromagnetic core 18 has a longitudinal passage 18b within which a spacer element 19 of non-magnetic material extends. In the exemplary embodiment shown in FIGS. 3 and 4, the spacer element is in the form of a rod (although it could be made in other shapes), and extends towards the top of the element 9 of the main plug 8, with a radial clearance through (and beyond) the passage 18b of the core 18.

A second ferromagnetic core, indicated by 21, is positioned above the spacer element 19, in the portion 7a of the body 7.

A coil spring 20 is positioned between the core 18 and a facing shoulder of the core 21. The spring 20 tends to push the movable core 18 and the associated plug 18a against the seat 13.

A coil spring 22 is positioned between the upper end of the second core 21 and the upper end wall of the portion 7a of the body 7. This spring 22 tends to push the core 21 downwards, particularly in such a way as to hold the latter against the upper end of the spacer element 19.

The spacer element 19 can be integral with (or otherwise permanently connected to) the diaphragm guide 9 (as shown in FIGS. 3 and 4) and/or the second core 21.

The length of the spacer element 19 is such that, in the rest state of the solenoid valve 1, shown in the figures, the cores 18 and 21 are separated by a narrow gap indicated by 24.

In operation, when the solenoid 15 is inactive, the fluid supplied to the inlet 3 enters the control chamber 11 through the passage or passages 8d, 9b and 9c. The movable core and plug 18 closes the valve seat 13, and the control chamber 11 is brought to the same fluid pressure as the inlet passage 3.

The portion 8c of the diaphragm 8, which acts as the main plug, bears on the valve seat 6, because the surface area of this diaphragm and of the associated diaphragm guide 9 exposed to the pressure in the chamber 11 is greater than the surface area of the membrane 8 which is exposed to the pressure in the passage 3. The main valve 8c-6 is therefore closed.

When the solenoid 15 is energized, a magnetic flux passes into the core 21 and through the gap 24 into the core 18, and then from here to the magnetic element 16. Thus the core 18 is attracted towards the core 21. This attraction causes the valve seat 13 to be opened against the action of the spring 20.

The fluid pressure in the control chamber 11 can then be discharged towards the outlet passage 4, through the passage 12 of the diaphragm guide 9.

As the pressure in the control chamber 11 decreases, the pressure in the inlet passage 3 which is applied to the diaphragm 8 causes the assembly formed by the diaphragm and the associated diaphragm guide 9 to rise, thus opening the main valve 8c-6.

The fluid supplied to the inlet passage 3 of the solenoid valve 1 can then reach the outlet passage through the valve seat 6.

The raising of the plug 8, 9 causes the core 21 to be raised by a corresponding amount and to pull with it the core 18 which is magnetically attracted to it; the seat 13 therefore continues to remain open.

The electrical power required to energize the solenoid 15 so as to create and maintain the attraction of the core 18 towards the core 21 is extremely low, and in particular it is independent of the opening travel of the main plug 8, 9.

Figure 5:
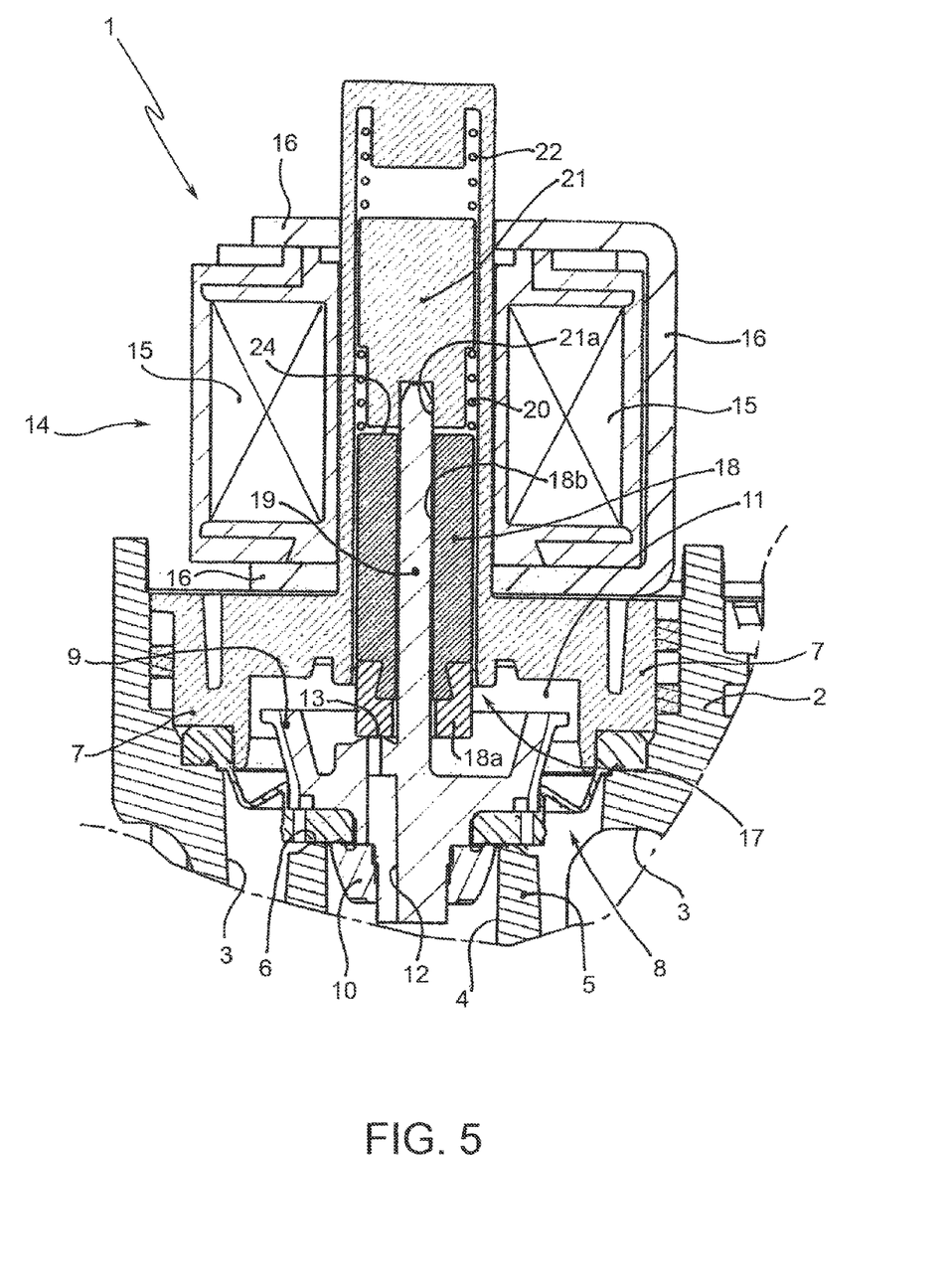
FIG. 5 is a sectional view of another variant embodiment.

FIG. 5 shows another variant embodiment. In this figure, parts and elements described previously have again been given the same alphanumeric references as those used previously.

In the variant shown in FIG. 5, the spacer rod 19 is integral with the upper ferromagnetic core 21, being for example mounted with an interference fit in a recess 21a of this core.

Figure 6:
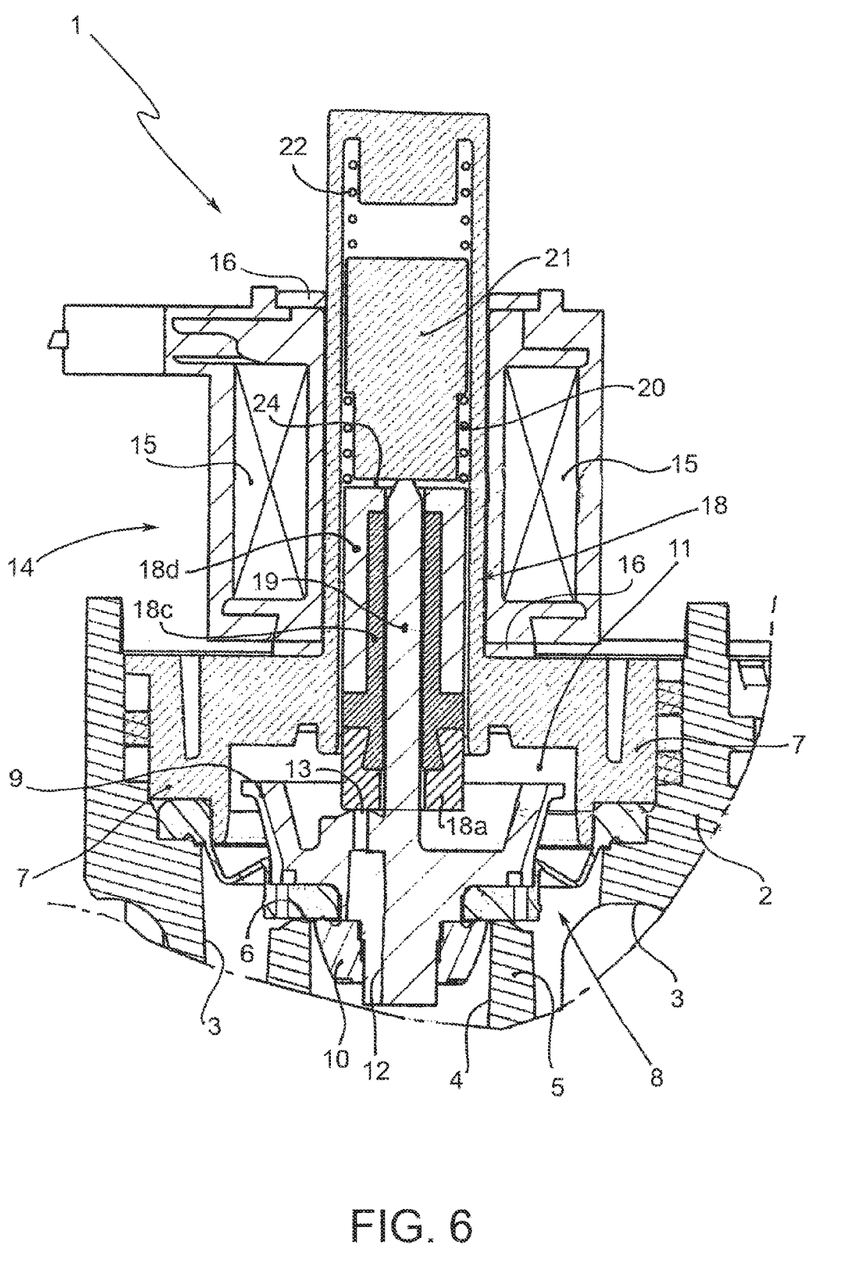
FIGS. 6 and 7 are sectional views of further variant embodiments.

FIG. 6 shows a variant embodiment of the lower movable core 18, which comprises a ferromagnetic part 18d and a part 18c made from non-magnetic material.

Clearly, the two variants shown in FIGS. 5 and 6 can be combined with each other.

Figure 7:
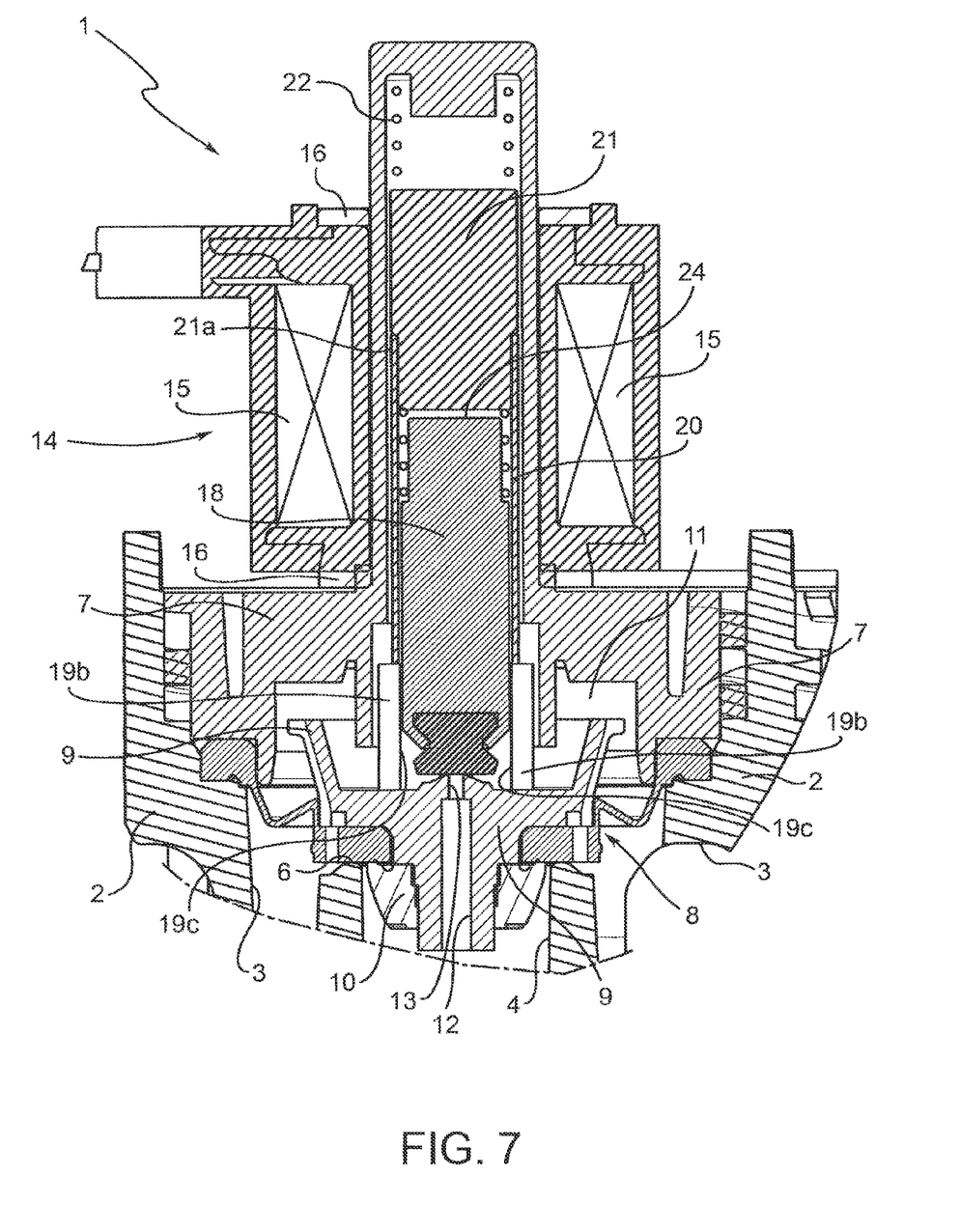

FIG. 7 shows another variant embodiment. In this drawing also, parts and elements described previously have been given the same alphanumeric references as those used previously.

In the variant of FIG. 7, a spacing structure, including a tubular element 19 and a plurality of rods 19b spaced apart angularly within the passage 13 of the diaphragm guide 9, is positioned between the diaphragm guide 9 and the second movable core 21. The tubular element 19 extends between a shoulder 21a of the core 21 and the rods 19b, around the spring 20 and the movable core 18.

Between the rods 19b there are formed large apertures 19c which, in operation, allow the water which flows from the chamber 11 towards the outlet 4 to flush the passage 13 and its surrounding region thoroughly, thus removing any sediment which might lead to the clogging of this passage over time.

The rods 19b can be integral with and/or fixed to the diaphragm guide 9, and the tubular element 19 can be fixed to or fitted on the core 21 and can bear on said rods 19b. Alternatively, the rods 19b can be integral with the tubular element 19 and can bear on the diaphragm guide 9.

Clearly, provided that the principle of the invention is retained, the forms of application and the details of construction can be varied widely from what has been described and illustrated purely by way of non-limiting example, without thereby departing from the scope of protection of the invention as defined by the attached claims.

The invention claimed is:

1. Solenoid valve device (1) comprising:
a body (2, 7) with an inlet (3) and an outlet (4) for the fluid, and with a main valve seat (6) through which the fluid can flow from the inlet (3) to the outlet (4),
a main plug (8, 9) which is movable with respect to said valve seat (6) between a closed position and an open position of said valve seat (6);
a control chamber (11) formed in the body (2, 7) and partially delimited by the main plug (8);
at least a first passage (8d, 9b, 9c) for communication between the inlet (3) and the control chamber (11);
at least a second passage (12, 13) for putting the control chamber (11) into communication with the outlet (4); and
a control solenoid valve (14) including a control solenoid (15) which controls a unit (17) which is movable in said solenoid (15) and which comprises a first ferromagnetic core (18) which can interact as a movable plug with said second passage (12, 13);
wherein said movable unit (17) comprises an additional or second movable ferromagnetic core (21) positioned in said solenoid (15) adjacent to one end of the aforesaid first core (18), and positioning means (19, 20, 22) are provided for keeping the second movable core (21) permanently connected to the main plug (8, 9) and, when the solenoid (15) is inactive, for keeping the first core (18) in the closed position of said second passage (12, 13) and the second core (21) in a predetermined position with respect to the first core (18) and to the solenoid (15), said cores (18, 21) being separated by a gap (24); said positioning means comprising a substantially non-magnetic movable spacer element (19) which extends between the main plug (8, 9) and said second movable core (21); the spacer element (19) being permanently connected to and displaceable together with the main plug (8, 9)
the arrangement being such that the energizing of the solenoid (15) causes the first core (18) to be attracted towards the second core (21) and causes said second passage (12, 13) to be opened, and a flow of fluid from the inlet (3) passes through the first passage (8d, 9b, 9c) to the control chamber (11);
the solenoid valve device being characterised in that said spacer element (19) extends with a radial clearance within the solenoid (15) and around the first core (18) and which has at least one aperture (23) in the proximity of the second core (21);
the arrangement being such that, when the solenoid (15) is activated, a flow of fluid flows between the solenoid (15) and said movable spacer element (19) towards the second core (21), reaches said second core (21) and then flows through said at least one aperture (23) of the spacer element (19) between the spacer element (19) and the first core (18) towards said second passage (13, 12).

2. Solenoid valve device according to claim 1, in which the spacer element (19) is permanently connected to the second movable core (21), and the positioning means comprise first resilient means (22) tending to push said second movable core (21) towards the first core (18).

3. Solenoid valve device according to claim 1, in which said positioning means comprise first and second resilient means (20, 22) tending to return the first and second movable cores (18, 21), respectively, towards the main plug (8, 9).

4. Solenoid valve device according to claim 3, in which said first resilient means comprise a spring (25) positioned in the aforesaid gap (24).

5. Solenoid valve device according to claim 3, in which said first resilient means (20) extend between a reaction surface (18a) of the first core (18) and a reaction surface (19a) of said spacer element (19).

6. Solenoid valve device according to claim 1, in which the solenoid (15) is associated with a magnetic circuit comprising a first and a second magnetic core (16a, 16b) which extend axially from opposite ends within the solenoid (15) and have corresponding ends which face each other at a predetermined distance, in an axially intermediate portion of the solenoid (15), and in which, in the inactive state of the solenoid (15), the first and the second core (18, 21) face each other in an area located between the facing ends of said magnetic elements (16a, 16b) with respect to the axis, the distance between the cores (18, 21) and said magnetic cores (16a, 16b) being less than the distance between the facing ends of said magnetic cores (16a, 16b).

* * * * *